Patented July 13, 1954

2,683,749

UNITED STATES PATENT OFFICE 2,683,749

POLYHALOGENATED ETHERS

Tracy M. Patrick, Jr., Dayton, Ohio, assignor to Monsanto Chemical Company, St. Louis, Mo., a corporation of Delaware No Drawing. Application January 5, 1951,
Serial No. 204,679

4 Claims. (Cl. 260—615)

The present invention relates to polyhalogenated organic compounds and deals more particularly with certain halogen-containing ethers and to methods of preparing the same.

According to the invention there are provided valuable new polyhalogenated ethers by the free-radical-catalyzed addition of certain polyhalomethanes to certain allyl ethers. The reaction is one of simple addition wherein one mole of the polyhalomethane compound adds to one or two moles of the ether. There are thus formed mixtures of 1:1 halomethane-allyl ether adducts and 1:2 halomethane-allyl ether adducts.

The 1:1 adducts are formed substantially according to the scheme:

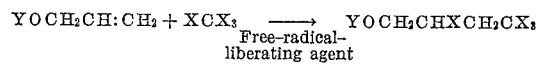

in which Y is selected from the class consisting of alkyl, cycloalkyl, aryl, alkaryl and aralkyl radicals of from 1 to 12 carbon atoms and X is selected from the class consisting of hydrogen, chlorine and bromine, and in which only one X is hydrogen in a single compound.

The 1:2 adducts are probably formed by the following series of reactions, based on the formation of a free trihalomethyl radical from the polyhalomethane in the presence of a free-radical-liberating agent.

(1) $-CX_3 + YOCH_2CH:CH_2 \longrightarrow$ 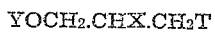

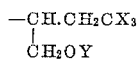

(2) $YOCH_2CH:CH_2 + $ 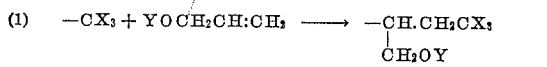

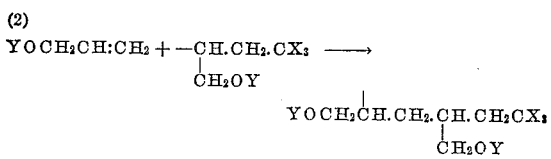

Chain termination is effected at this stage by abstraction of a halogen or hydrogen atom from the original halomethane. There is thus formed the 1:2 polyhalomethane-allyl ether addition product:

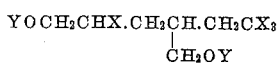

Depending upon the participation of either one mole or two moles of, say, an alkyl allyl ether with, e. g., carbon tetrachloride, there are thus formed either alkyl 2,4,4,4 - tetrachlorobutyl ethers and/or alkyl 4-alkoxymethyl-2,6,6,6-tetrachlorohexyl ethers. Both types of adducts may be represented by the general formula $$YOCH_2.CHX.CH_2T$$

in which Y is as above defined, X is selected from the class consisting of hydrogen, chlorine and bromine and T is selected from the class consisting of the radical $-CX_3$ and the radical $$-CH.CH_2CX_3$$
$$\quad\;|\;$$
$$\;\;CH_2OY$$

and in which only one X is hydrogen in a single compound.

In addition to the 1:1 and 1:2 halomethane-allyl ether adducts, there also are usually formed mixtures of higher adducts, i. e., products in which one mole of the halomethane compound has combined with, say, from 3 to 30 moles of the allyl ether. The well-defined 1:1 adduct or the 1:2 adduct may be readily separated from such higher addition products, e. g., by distillation.

Polyhalomethanes suitable for the preparation of the present polyhalogenated ethers are, e. g., carbon tetrachloride, carbon tetrabromide, chloroform, bromoform, bromotrichloromethane, chlorotribromomethane, dichlorodibromomethane, etc. Allyl ethers useful for the present purpose are alkyl allyl ethers such as methyl, ethyl, propyl, isopropyl, butyl, isobutyl, tert-butyl, amyl, hexyl, octyl, decyl or lauryl allyl ether; aryl allyl ethers such as phenyl allyl ether, β-naphthyl allyl ether or 4-xenyl allyl ether; cycloalkyl allyl ethers such as cyclohexyl allyl ether; alkaryl allyl ethers such as 4-tolyl allyl ether or 4-ethylphenyl allyl ether; and aralkyl ethers such as benzyl allyl ether.

Free-radical-liberating agents which may be employed in promoting addition of the polyhalomethane compound to the allyl ether are compounds which will decompose to give free radicals. Such compounds include peroxygen-type catalysts, for example, acyl peroxides such as acetyl, benzoyl, lauroyl or stearoyl peroxide; hydrocarbon peroxides, or hydroperoxides such as di-tert-butyl peroxide, di-tert-amyl peroxide, tert-butyl hydroperoxide, cumene hydroperoxide or p-cymene hydroperoxide; the inorganic per compounds such as hydrogen peroxide, sodium peroxide, sodium perborate, potassium persulfate, etc. For convenience, these oxygen-liberating agents will be hereinafter referred to as peroxidic compounds. Only catalytic quantities of a peroxidic compound need be employed in promoting the addition reaction. Quantities of as little as 0.001 per cent to 1.0 per cent, based on the weight of the ether, are generally sufficient to give optimum yields of the addition products. In order to avoid detrimental side reactions, quantities of more than 5 per cent of the peroxidic compound, based on the weight of the ether should not be employed. Ultra-violet light may be employed with the catalyst or as the sole catalytic agent.

The addition reaction may be effected simply by contacting the ether with the polyhalomethane in the presence of a free-radical liberating agent such as a peroxidic compound at ordinary or increased temperatures, depending upon the nature of the individual reactants employed. The reaction may be effected by mixing together the allyl ether, polyhalomethane and catalyst and maintaining the resulting mixture, advantageously with agitation, at a temperature which permits steady decomposition of the catalyst and consequent steady liberation of trihalomethyl free-radicals. Or, if desired, the ether may be added gradually, e. g., dropwise, to the polyhalomethane compound, while constantly maintaining an optimum quantity of active catalyst in the reaction zone, which zone is preferably kept at a temperature conducive to the formation of free-radicals. Depending upon the nature of the individual reactants and catalyst, temperatures of from above room temperature to about 125° C. may be generally employed. In most instances, operation at the refluxing temperature of the reaction mixture gives good results.

Substantially equimolar quantities of the polyhalomethane and the ether may be used; however, for good yields of the adducts an excess of the polyhalomethane is preferred, such an excess serving as diluent for the reaction. An extraneous inert solvent or diluent, e. g., benzene or hexane, may be employed, either to serve as catalyst solvent, to mitigate reaction heat, or to dilute the concentration of the ether in the reaction mixture. The use of such a solvent or diluent, however, is generally of little economic advantage.

The formation of 1:1 addition products versus the 1:2 polyhalomethane-allyl ether adducts is a function of reaction conditions as well as of reactant quantities. With a large excess of the polyhalomethane the formation of the 1:1 adducts is favored; however, even when employing substantially equimolar quantities of the reactants, some of the 1:2 halomethane-ether adduct is formed. Mixtures of the 1:1 and 1:2 adducts which are generally obtained may be easily resolved, e. g., by fractional distillation, solvent extraction and/or fractional crystallization. Usually vacuum distillation suffices to give a good separation of the adducts. In many cases, however, isolation of the two products is unnecessary, mixtures of the 1:1 and 1:2 adducts being useful for a wide variety of industrial purposes.

Depending upon the nature of the individual reactants, i. e., the polyhalomethane compound and the allyl ether, the new adducts are stable, well-characterized materials which vary from mobile or viscous liquids to waxy or crystalline solids. The 1:1 adducts, e. g., the alkyl or aryl 2,4,4,4-tetrachlorobutyl ethers and the 1:2 adducts, e. g., the alkyl or aryl 4-alkoxymethyl or 4-aryloxymethyl-2,6,6,6-tetrachlorohexyl ethers are advantageously employed as cross-linking agents for natural rubber or synthetic rubber stocks such as the polymers and copolymers of 1,3-butadiene compounds, e. g., copolymers of 1,3-butadiene with acrylonitrile or styrene. Since both types of adducts are generally valuable for this purpose, the undistilled reaction product resulting from the free-radical-catalyzed addition reaction of the polyhalomethane and the allyl ether may be added directly to the rubber stock. Inasmuch as the addition reaction is extremely easy to carry out, the use of the crude reaction product provides an economical means of improving the vulcanizing properties of rubber.

Of especial importance as cross-linking agents for synthetic rubbers obtained by polymerizing a 1,3-butadiene compound, either alone or in admixture with other polymerizable compounds which are capable of copolymerizing with the butadiene compounds, are mixtures of alkyl 2,4,4,4-tetrachlorobutyl ethers having the general formula alk. O.CH$_2$.CHCl.CH$_2$.CCl$_3$ in which alk denotes an alkyl radical of from 1 to 8 carbon atoms, and alkyl 4-alkoxymethyl-2,6,6,6-tetrachlorohexyl ethers having the general formula

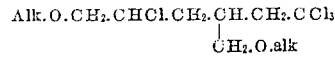

which are obtained by the reaction of carbon tetrachloride with alkyl allyl ethers in which the alkyl radical has from 1 to 8 carbon atoms. Mixtures of such adducts are readily prepared from easily available alkyl ethers and either the isolated alkyl 2,4,4,4-tetrachlorobutyl ether or the isolated alkyl 4-alkoxymethyl-2,6,6,6-tetrachlorohexyl ether or mixtures of the same confer valuable vulcanizing properties to the 1,3-butadiene rubbers.

The alkyl or aryl 2,4,4,4-tetrachlorobutyl ethers in which the alkyl or aryl radical contains from 1 to 12 carbon atoms are valuable as plasticizers for synthetic resins, particularly for polyvinyl esters and polyvinyl halides, to which plastics the tetrahalogenated ethers impart not only valuable strength properties but also a high degree of heat-resistance and non-flammability.

Alkyl 4-alkoxymethyl-2,6,6,6-tetrachlorohexyl ethers in which each alkyl and each alkoxy radical has from 1 to 8 carbon atoms also find use as vinyl resin plasticizers, but they are most advantageously employed as hydrocarbon oil additives, especially in the compounding of extreme pressure-resisting lubricants.

The invention is further illustrated, but not limited by the following example.

*Example*

A mixture consisting of 86.1 g. (1.0 mole) of allyl ethyl ether and 462 g. (3.0 moles) of carbon tetrachloride was brought to refluxing temperature (70.5° C.) and to this there was then gradually added, during 15 minutes, 5.0 g. of benzoyl peroxide. Refluxing was then continued for 68 hours, at the end of which period the temperature of the reaction mixture was 72.5° C. The resulting mixture was distilled to remove material boiling up to 74° C. at atmospheric pressure, and the residue was filtered and stripped to remove the remainder of the carbon tetrachloride. The stripped residue was washed with aqueous sodium bicarbonate, washed until neutral with water, dried over "Drierite," filtered, and finally distilled through a 10-inch Vigreux column to yield the following fractions:

(a) B. P. 90° C.–106° C./10 mm., $n_D^{25}$ 1.4710.
(b) B. P. 68° C.–125° C./1.0 mm., $n_D^{25}$ 1.4738.

Redistillation of portions of the combined (a) and (b) gave the following:

(1) B. P. 82° C.–84.5° C./5 mm., substantially pure ethyl 2,4,4,4-tetrachlorobutyl ether, $n_D^{25}$ 1.4711, $$d_{25}^{25}\ 1.3050$$

analyzing 58.72% Cl; calcd. Cl for $$C_6H_{10}OCl_4 = 59.07\%$$

(2) B. P. 117° C.–121° C./1 mm., substantially pure ethyl 4-ethoxymethyl-2,6,6,6-tetrachlorohexyl ether, $n_D^{25}$ 1.4732, $$d_{25}^{25}\ 1.1968$$

analyzing 42.93% Cl; calcd. Cl for $$C_{11}H_{20}O_2Cl_4 = 43.38\%$$

A mixture of fractions (a) and (b) is advantageously employed, without further fractionation to (1) and (2), as a cross-linking agent in the vulcanization of the synthetic rubber Hycar OR–15 (a butadiene-acrylonitrile copolymer). Incorporation of the substantially pure ethyl 2,4,4,4-tetrachlorobutyl ether (fraction (1)) into a vinyl acetate-vinyl chloride copolymer in quantities of up to 40 per cent by weight of the rubber gave upon conventional molding a product of improved strength and thermal characteristics. The substantially pure ethyl 4-ethoxymethyl-2,6,6,6-tetrachlorohexyl ether was advantageously employed as a lubricant additive.

Operating as in the above example, there may be prepared 1:1 and 1:2 adducts of other polyhalomethane and saturated hydrocarbon allyl ethers. Thus, instead of carbon tetrachloride, chloroform may be similarly reacted with allyl ethyl ether to yield ethyl 4,4,4-trichlorobutyl-ether and ethyl 4-ethoxymethyl-6,6,6-trichlorohexyl ether. The allyl ethyl ether may be replaced by other saturated hydrocarbon allyl ethers, e. g., allyl isobutyl ether, allyl lauryl ether, allyl phenyl ether or allyl benzyl ether to give new and useful tri- or tetra-chlorinated ethers. Polybromomethanes or polyhalomethanes containing both bromine and chlorine may be used, choice of the halomethane depending upon the contemplated application of the addition product. For most industrial uses, e. g., for use as rubber cross-linking agents, lubricants, synthetic resin plasticizers, etc., the polychloromethane addition products are preferred both from the standpoint of economy and desirable physical characteristics.

What I claim is:

1. An alkyl 4-alkoxymethyl-2,6,6,6-tetrachlorohexyl ether in which each alkyl radical and each alkoxy radical has from 1 to 8 carbon atoms.

2. Ethyl 4-ethoxymethyl-2,6,6,6-tetrachlorohexyl ether.

3. The process which comprises contacting carbon tetrachloride, in the presence of a peroxidic compound, with an allyl alkyl ether in which the alkyl radical has from 1 to 12 carbon atoms and recovering from the resulting reaction product an alkyl 4-alkoxymethyl-2,6,6,6-tetrachlorohexyl ether in which each alkyl radical and each alkoxy radical has from 1 to 8 carbon atoms.

4. The process which comprises contacting carbon tetrachloride with allyl ethyl ether in the presence of benzoyl peroxide and recovering ethyl 4-ethoxymethyl-2,6,6,6-tetrachlorohexyl ether from the resulting reaction product.

References Cited in the file of this patent

UNITED STATES PATENTS

| Number | Name | Date |
| --- | --- | --- |
| 2,075,312 | Straus | Mar. 30, 1937 |
| 2,502,355 | Usteri et al. | Mar. 28, 1950 |
| 2,560,219 | Glickman | July 10, 1951 |
| 2,561,516 | Ladd et al. | July 24, 1951 |
| 2,568,859 | Ladd et al. | Sept. 25, 1951 |